(12) United States Patent
Cidambi et al.

(10) Patent No.: US 8,707,441 B1
(45) Date of Patent: Apr. 22, 2014

(54) TECHNIQUES FOR IDENTIFYING OPTIMIZED MALICIOUS SEARCH ENGINE RESULTS

(75) Inventors: Chandrasekhar Cidambi, Fremont, CA (US); Nithya Raman, T. Nagar (IN); Tuan-Khanh Tran, Santa Ana, CA (US)

(73) Assignee: Symantec Corporation, Mountain View, CA (US)

( * ) Notice: Subject to any disclaimer, the term of this patent is extended or adjusted under 35 U.S.C. 154(b) by 271 days.

(21) Appl. No.: 12/858,239

(22) Filed: Aug. 17, 2010

(51) Int. Cl.
*G06F 11/00* (2006.01)

(52) U.S. Cl.
USPC ............... 726/25; 726/22; 705/51; 707/722

(58) Field of Classification Search
None
See application file for complete search history.

(56) References Cited

U.S. PATENT DOCUMENTS

| | | | |
|---|---|---|---|
| 6,721,721 B1* | 4/2004 | Bates et al. ........................ 1/1 |
| 7,272,782 B2* | 9/2007 | Sneh ........................... 715/205 |
| 7,873,635 B2* | 1/2011 | Wang et al. ................... 707/735 |
| 8,468,602 B2* | 6/2013 | McDougal et al. ............. 726/23 |
| 2005/0021740 A1* | 1/2005 | Bar et al. ...................... 709/224 |
| 2005/0188361 A1* | 8/2005 | Cai et al. ...................... 717/148 |
| 2005/0268338 A1* | 12/2005 | van der Made ................ 726/24 |
| 2006/0095416 A1* | 5/2006 | Barkhin et al. .................. 707/3 |
| 2006/0101334 A1* | 5/2006 | Liao et al. ..................... 715/523 |
| 2006/0136374 A1* | 6/2006 | Shelest et al. .................... 707/3 |
| 2006/0184500 A1* | 8/2006 | Najork et al. ..................... 707/1 |
| 2006/0248072 A1* | 11/2006 | Brewer et al. .................... 707/5 |
| 2007/0180356 A1* | 8/2007 | Sun .............................. 715/511 |
| 2008/0301281 A1* | 12/2008 | Wang et al. ................... 709/224 |
| 2009/0089296 A1* | 4/2009 | Stemeseder et al. ........... 707/10 |
| 2010/0037314 A1* | 2/2010 | Perdisci et al. ................. 726/22 |
| 2010/0138485 A1* | 6/2010 | Chow et al. ................... 709/203 |
| 2010/0293185 A1* | 11/2010 | Rosado et al. ................ 707/769 |
| 2011/0197281 A1* | 8/2011 | Alme et al. ..................... 726/24 |

OTHER PUBLICATIONS

TrendSecure, TrendProtect™ Overview; Trend Micro, Inc.; 2010; 2 pages; found at http://www.trendsecure.com/portal/en-US/tools/security_tools/trendprotect/overview.

McAfee; McAfee SiteAdvisor®; The State of Search Engine Safety; McAfee, Inc.; 2010; 15 pages; found at http://www.siteadvisor.com/studies/search_safety_may2007.

AVG; AVG LinkScanner User Manual; AVG Technologies CZ; 2010; pp. 1-47; found at http://download.avg.com/filedir/doc/FREE_PRODUCTS/SALS/avg_lsf_uma_en_90_6.pdf.

\* cited by examiner

*Primary Examiner* — Hung Le

(74) *Attorney, Agent, or Firm* — Wilmer Cutler Pickering Hale and Dorr LLP

(57) ABSTRACT

Techniques for identifying optimized malicious search engine results are disclosed. In one particular exemplary embodiment, the techniques may be realized as a method for identifying optimized malicious search engine results comprising receiving a search item result, analyzing, using a computer processor, the search item result in a secure environment to detect malicious content hidden using network redirection, determining that the search item result is associated with malware, and providing an indicator that the search item result is associated with malware.

18 Claims, 6 Drawing Sheets

| S.No | Search Terms | Clean | Malicious | Total |
|---|---|---|---|---|
| 1 | oscar ballot 2010 printable | 27 | 75 | 102 |
| 2 | what time do the oscars start 2010 | 27 | 74 | 101 |
| 3 | oscars 2010 schedule | 35 | 71 | 106 |
| 4 | printable oscar ballot | 34 | 71 | 105 |
| 5 | geoffrey fletcher | 35 | 68 | 103 |
| 6 | oscars 2010 tv schedule | 37 | 67 | 104 |
| 7 | oscars 2010 time | 37 | 67 | 104 |
| 8 | the new tenants | 36 | 65 | 101 |
| 9 | elinor burkett | 38 | 64 | 102 |
| 10 | oscar 2010 time | 41 | 64 | 105 |
| 11 | oscar winners 2010 | 42 | 62 | 104 |
| 12 | the new tenants short film | 40 | 62 | 102 |
| 13 | barbara walters oscar special 2010 | 40 | 62 | 102 |
| 14 | music by prudence | 44 | 60 | 104 |
| 15 | booth gardner | 41 | 60 | 101 |
| 16 | elinor burkett prudence | 43 | 60 | 103 |
| 17 | booth gardner documentary | 43 | 59 | 102 |
| 18 | logorama wiki | 41 | 59 | 100 |
| 19 | academy awards 2010 time | 48 | 54 | 102 |
| 20 | Sandra Bullock Meryl Streep kiss youtube | 49 | 51 | 100 |
| 21 | best supporting actor 2009 | 50 | 51 | 101 |
| 22 | sandra bullock meryl streep kiss | 53 | 49 | 102 |
| 23 | logorama movie youtube | 51 | 49 | 100 |
| 24 | kathryn bigelow height | 53 | 49 | 102 |
| 25 | oscars 2010 date and time | 54 | 48 | 102 |

| Web | Images | Videos | Maps | News | Shopping | Gmail | more ▼ |

Google [ brad stevens ] [Search] Advanced Search

Web ⊞show options...    Results 11 - 20 of about 605,000 for brad stevens (0.21 seconds)

Brad Stevens Facebook ⊗
ChaCha has the answer to the question: How much does Brad Stevens the coach of Butler make. Become a ChaCha Fan on Facebook. Follow ChaCha on Twitter. ...
designdiagnosis.com/uwluf.php?...brad%20stevens%20faceboook - 5 hours ago

Brad Stevens Twitter ⊗
Brad Stevens (left) describes the Gold Card benefits to customers and . Comment below or sign in with TypePad Facebook Twitter and more ...
fusion-enterprises.net/tfnbd.php?p=brad%20stevens%20twitter - 6 hours ago

Brad Stevens Butler ⊗
Indianapolis Business Journal wrote a note titled Today's 40 UNDER 40 featured honoree: BRAD STEVENS, Butler men's hoops coach. ...
derecho-comparado.com/bkfxa.php?...brad%20stevens%20butler - 6 hours ago

Brad Stevens Wiki ⊗
Brad Stevens Buler Coach - Ups Tracking - A Hug From Taylor Swift - Brad Stevens Wiki - Butler Bulldogs - Jason Mattera Cpac Speech - Youtube.com/Watch. ...
designedinglass.com/ivojr.php?on=brad%20stevens%20wiki - 5 hours ago

Brad Stevens Wiki ⊗
Philadelphia Union Wiki - Stephanie Getz Obituary - Brad Stevens Butler Salary - Urban Meyer - Gw Admissions Activity Center. . Brad Stevens Wiki - George ...
naturally well.net/mdgvu.php? off=brad%20stevens%20Wiki - 5 hours ago

Brad Stevens Butler Salary ⊗
Mar 26, 2010 ... Butler coach Brad Stevens has been the Horizon League Coach of the Year the past two seasons and has more wins (84) than any ...
designcreteusa.com/uftau.php?...brad%20stevens%20butler%20salary - 6 hours ago Searches related to brad stevens brad stevens butler      brad stevens starbucks      brad stevens photography bradley stevens          bradford stevens            angelina stevens brad savage              brad stephens ◀Goooooooooogle▶
Previous 1 2 3 4 5 6 7 8 9 10 11  Next

[ brad stevens ] [Search]
Search within results - Language Tools - Search Help - Dissatisfied?
Help us improve - Try Google Experimental
Google Home - Advertising Programs - Business Solutions - Privacy - About Google

Fig. 6

TECHNIQUES FOR IDENTIFYING OPTIMIZED MALICIOUS SEARCH ENGINE RESULTS

FIELD OF THE DISCLOSURE

The present disclosure relates generally to network security and, more particularly, to techniques for identifying optimized malicious search engine results.

BACKGROUND OF THE DISCLOSURE

Search engine optimization (SEO) is a collection of techniques used to achieve higher search rankings for a given website. "Black hat SEO" is the method of using unethical SEO techniques in order to obtain a higher search ranking. These techniques may include things like keyword stuffing, cloaking, and link farming, which are used to "game" the search engine algorithms. Hackers may use these techniques to poison search results of popular search terms to redirect users to misleading applications (e.g., fake antivirus scanners) or other malware. Hackers may identify vulnerable network sites and add numerous additional fake web pages to these sites. These fake pages may be based on popular search terms such as, for example, keywords in the Google "Hot trends" or popular terms in other search engines.

For example, malicious Uniform Resource Locators (URLs) returned by searching for "super bowl 2010 line" may include links that hackers want to look legitimate. Hackers may also add related content to these pages. Each of these fake web pages may be added without the website owner's knowledge or consent. When a user clicks on these links in the search result page, they may be redirected to fake antivirus pages or other malware.

These search engine optimized pages may distinguish between a search engine accessing them, a user accessing them directly, and a user accessing the page by clicking on or otherwise navigating from a search engine result. Because of this distinction the web site (which may be a legitimate website that has been hacked) may provide different content to different requesters. A web crawler or other search engine component accessing the web page may be provided with content related to a popular keyword. A person navigating directly to the web page may receive a normal web page (e.g., a web page associated with the site before it was hacked). However, a person navigating to the site via a search engine result may be redirected to a site associated with malware (e.g., a URL which downloads malware to a client, a site offering misleading applications, or another malware site). Because a person navigating directly to the webpage may not discover the malware, the malware may remain hidden longer. Because the malware associated site may use keyword stuffing of popular keywords and link farming the malware may achieve a high ranking on one or more search engines. This may allow the malware to be effectively distributed. However, the pages upon which the search results are based may not be the pages that will be returned when a user clicks on the search result. Instead the user may be redirected to a malware site. This may provide a challenge to normal methods used to detect and prevent malware. Additionally, these sites may frequently change and may be updated to respond to new popular keywords or trends. A hacker may use other methods to make search results look legitimate. Some hacked or malware sites may trick a search engine into thinking they are a legitimate site (e.g., CNN). The malicious search result may then display as if it were from the legitimate website. Some hacked or malware sites may trick a search engine into thinking a malicious URL is associated with a particular type of content which may appear more legitimate or safer (e.g., a PDF file). These measures and others may make optimized malicious search engine results difficult to detect.

In view of the foregoing, it may be understood that there may be significant problems and shortcomings associated with current optimized malicious search engine results identification technologies.

SUMMARY OF THE DISCLOSURE

Techniques for identifying optimized malicious search engine results are disclosed. In one particular exemplary embodiment, the techniques may be realized as a method for identifying optimized malicious search engine results comprising receiving a search item result, analyzing, using a computer processor, the search item result in a secure environment to detect malicious content hidden using network redirection, determining that the search item result is associated with malware, and providing an indicator that the search item result is associated with malware.

In accordance with other aspects of this particular exemplary embodiment, analyzing may comprise automatically navigating to a network location associated with the search item result using a network request configured to appear to the network location as a network request from a user of the search result.

In accordance with further aspects of this particular exemplary embodiment, the network request may comprise a network request containing at least one of a referring search engine Uniform Resource Locator (URL), a user agent set as a browser, and a source id set as a browser.

In accordance with additional aspects of this particular exemplary embodiment, the determination may be based upon at least one of: a signature, behavioral analysis, and reputation based analysis.

In accordance with additional aspects of this particular exemplary embodiment, the secure environment may comprise a virtual environment containing security software to address malware threats.

In accordance with additional aspects of this particular exemplary embodiment, the techniques may further comprise identifying a popular search term, and performing a search using the identified popular search term.

In accordance with additional aspects of this particular exemplary embodiment, the popular search term may be identified by one or more of: using a search engine index of most popular search terms, collecting one or more statistics from users associated with search data, and identifying search terms based on popular current events.

In accordance with additional aspects of this particular exemplary embodiment, the search engine result may be received from a remote computing device.

In accordance with additional aspects of this particular exemplary embodiment, the indicator that the search item result is associated with malware may be provided to the remote computing device.

In accordance with additional aspects of this particular exemplary embodiment, the techniques may further comprise blocking access to the search item result based at least in part on the determination that the search item result is associated with malware.

In accordance with additional aspects of this particular exemplary embodiment, the techniques may further comprise providing a warning associated with the search item result based at least in part on the determination that the search item result is associated with malware.

In accordance with additional aspects of this particular exemplary embodiment, the techniques may further comprise storing the indicator that the search item result is associated with malware in a repository.

In accordance with additional aspects of this particular exemplary embodiment, providing an indicator that the search item result is associated with malware may comprise at least one of: transmitting the indicator to a client device component, transmitting the indicator to a gateway, and transmitting the indicator to a firewall.

In accordance with additional aspects of this particular exemplary embodiment, the client device component may comprise a browser component designed to perform one or more of: denying access to a search item result network site indicated as associated with malware, providing a warning about a search item result network site indicated as associated with malware, and activating one or more security components to reduce a threat from a search item result network site indicated as associated with malware.

In accordance with additional aspects of this particular exemplary embodiment, the gateway may comprise a component configured to perform one or more of deny access to search item results indicated as associated with malware, and filter out search item results indicated as associated with malware.

In accordance with additional aspects of this particular exemplary embodiment, network redirection may comprise an HTTP redirection code.

In accordance with additional aspects of this particular exemplary embodiment, the techniques may be realized as at least one processor readable storage medium for storing a computer program of instructions configured to be readable by at least one processor for instructing the at least one processor to execute a computer process for performing the method as recited in claim 1.

In another particular exemplary embodiment, the techniques may be realized as an article of manufacture for identifying optimized malicious search engine results, the article of manufacture comprising at least one non-transitory processor readable medium, and instructions stored on the at least one medium, wherein the instructions are configured to be readable from the at least one medium by at least one processor and thereby cause the at least one processor to operate so as to: receive a search item result, analyze the search item result in a secure environment to detect malicious content hidden using network redirection, determine that the search item result is associated with malware, and provide an indicator that the search item result is associated with malware.

In yet another particular exemplary embodiment, the techniques may be realized as a system for identifying optimized malicious search engine results comprising one or more processors communicatively coupled to a network, wherein the one or more processors are configured to: receive a search item result, analyze the search item result in a secure environment to detection malicious content hidden using network redirection, determine that the search item result is associated with malware, and provide an indicator that the search item result is associated with malware.

In accordance with additional aspects of this particular exemplary embodiment, the one or more processors may further be configured to: identify a popular search term, and perform a search using the identified popular search term.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

FIG. 5 depicts analysis of detection of malicious search engine results in accordance with an embodiment of the present disclosure.

FIG. 6 depicts a user interface indicating detection of malicious search engine results in accordance with an embodiment of the present disclosure.

DETAILED DESCRIPTION OF EXEMPLARY EMBODIMENTS

Figure 1:
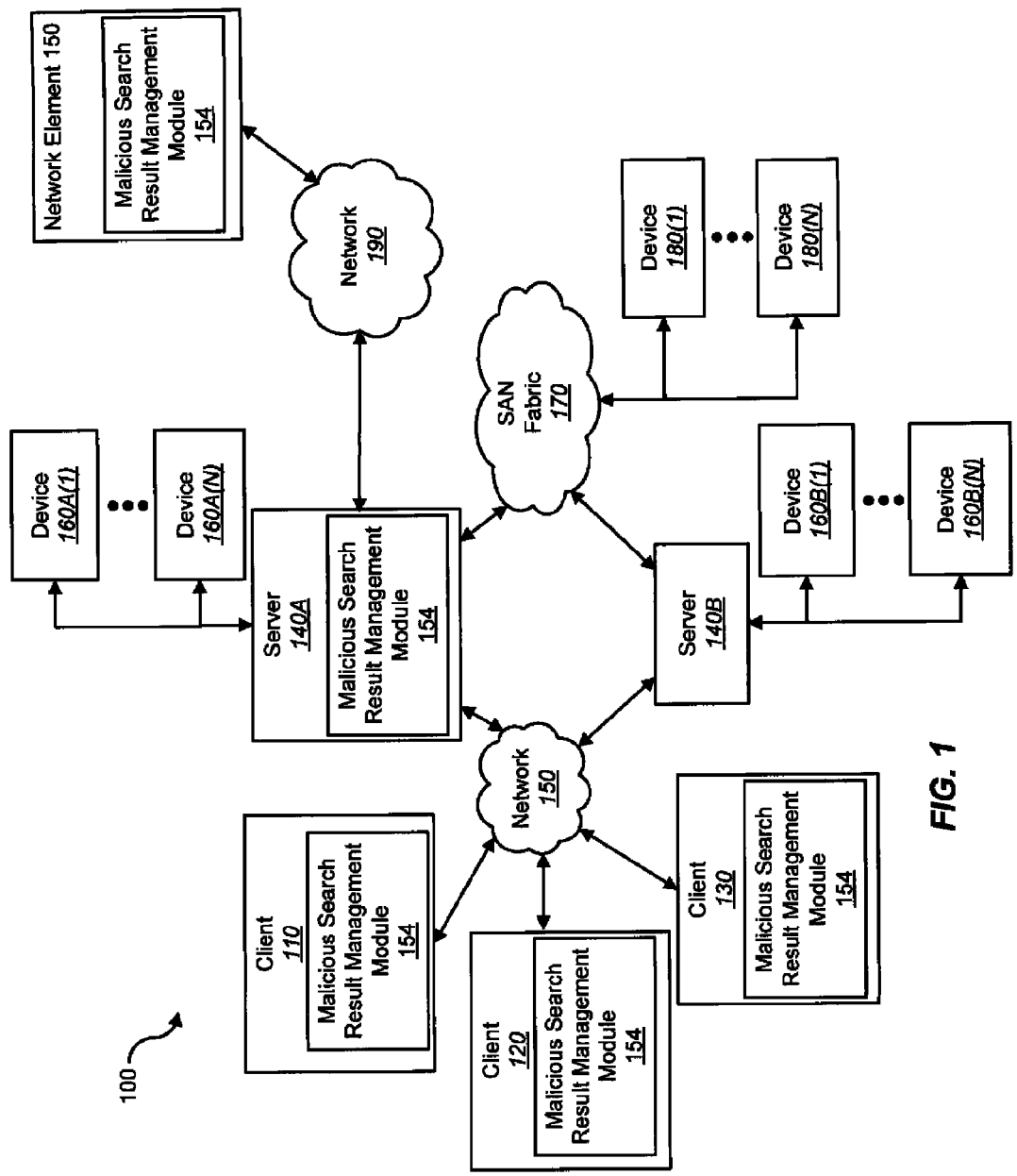
FIG. 1 shows a block diagram depicting a network architecture for identifying optimized malicious search engine results in accordance with an embodiment of the present disclosure.

FIG. 1 shows a block diagram depicting a network architecture 100 for identifying optimized malicious search engine results in accordance with an embodiment of the present disclosure. FIG. 1 is a simplified view of network architecture 100, which may include additional elements that are not depicted. Network architecture 100 may contain client systems 110, 120 and 130, as well as servers 140A and 140B (one or more of which may be implemented using computer system 200 shown in FIG. 2). Client systems 110, 120 and 130 may be communicatively coupled to a network 150. Server 140A may be communicatively coupled to storage devices 160A(1)-(N), and server 140B may be communicatively coupled to storage devices 160B(1)-(N). Servers 140A and 140B may contain a management module (e.g., malicious search result management module 154 of server 140A). Servers 140A and 140B may be communicatively coupled to a SAN (Storage Area Network) fabric 170. SAN fabric 170 may support access to storage devices 180(1)-(N) by servers 140A and 140B, and by client systems 110, 120 and 130 via network 150. Server 140A may be communicatively coupled to network 190. Network element 150 may be communicatively coupled to network 190. Network element 150 may contain malicious search result management module 154.

Figure 2:
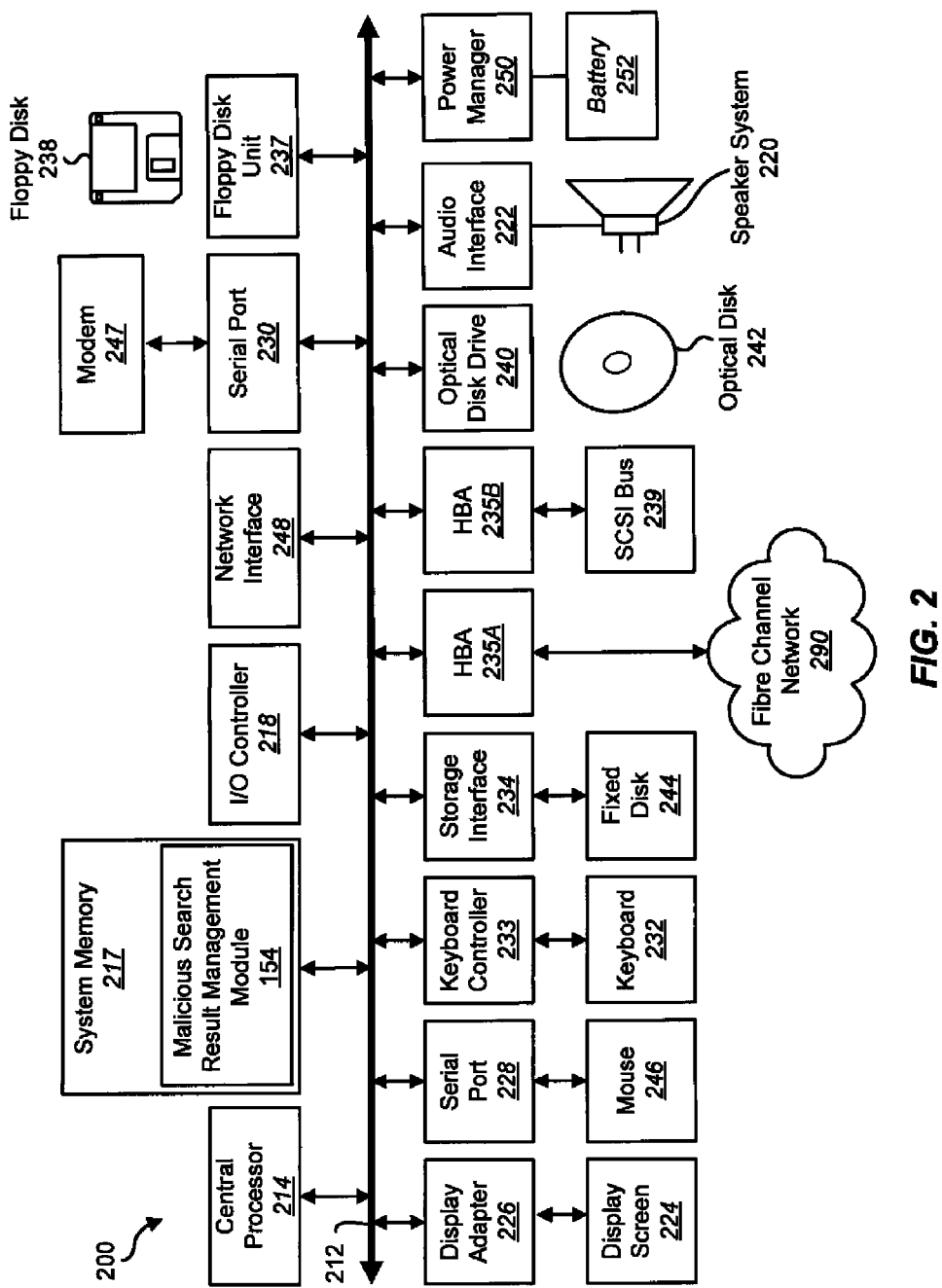
FIG. 2 depicts a block diagram of a computer system in accordance with an embodiment of the present disclosure.

With reference to computer system 200 of FIG. 2, modem 247, network interface 248, or some other method may be used to provide connectivity from one or more of client systems 110, 120 and 130 to network 150. Client systems 110, 120 and 130 may be able to access information on server 140A or 140B using, for example, a web browser or other client software (not shown). Such a client may allow client systems 110, 120 and 130 to access data hosted by server 140A or 140B or one of storage devices 160A(1)-(N), 160B(1)-(N), and/or 180(1)-(N).

Networks 150 and 190 may be local area networks (LANs), wide area networks (WANG), the Internet, cellular networks, satellite networks, or other networks that permit communication between clients 110, 120, 130, servers 140, and other devices communicatively coupled to networks 150 and 190. Networks 150 and 190 may further include one, or any number, of the exemplary types of networks mentioned above operating as a stand-alone network or in cooperation with each other. Networks 150 and 190 may utilize one or more protocols of one or more clients or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160B(1)-(N), and/or 180(1)-(N) may be network accessible storage and may be local, remote, or a combination thereof to server 140A or 140B. Storage devices 160A(1)-(N), 160B(1)-(N), and/or 180(1)-(N) may utilize a redundant array of inexpensive disks ("RAID"), magnetic tape, disk, a storage area network ("SAN"), an Internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for backup or archival purposes.

According to some embodiments, clients 110, 120, and 130 may be smartphones, PDAs, desktop computers, a laptop computers, servers, other computers, or other devices coupled via a wireless or wired connection to network 150. Clients 110, 120, and 130 may receive data from user input, a database, a file, a web service, and/or an application programming interface.

Servers 140A and 140E may be application servers, archival platforms, backup servers, network storage devices, media servers, email servers, document management platforms, enterprise search servers, or other devices communicatively coupled to network 150. Servers 140A and 140B may utilize one of storage devices 160A(1)-(N), 160B(1)-(N), and/or 180(1)-(N) for the storage of application data, backup data, or other data. Servers 140A and 140B may be hosts, such as an application server, which may process data traveling between clients 110, 120, and 130 and a backup platform, a backup process, and/or storage.

According to some embodiments, clients 110, 120, and/or 130 may contain one or more portions of software for managing optimized malicious search engine results such as, for example, malicious search result management module 154. As illustrated, one or more portions of malicious search result management module 154 may reside at a client. One or more portions of malicious search result management module 154 may reside at a network centric location. For example, server 140A may be a server, a firewall, a gateway, or other network element that may perform one or more actions to gather, identify, and/or block an optimized malicious search engine result. According to some embodiments, network 190 may be an external network (e.g., the Internet) and server 140A may be a gateway or firewall between one or more internal components and clients and the external network. Network element 150 may be a server, a host, or other computing platform which may contain malicious search result management module 154.

According to some embodiments, network element 150 may contain one or more virtual environments which may be used to detect optimized malicious search results. Network element 150 may reside at a security software provider, a service provider or other entity. The virtual environments of network element 150 may contain security software designed to protect against malware threats. Malicious search result management module 154 may receive a search result and may analyze the search result to determine whether the search result is associated with malware. Malicious search result management module 154 may be capable of detecting cloaked or otherwise optimized, poisoned, or malicious search engine results.

Cloaked URLs may redirect to malware associated content (e.g., fake antivirus pages) only when a network request attribute (e.g., the Referrer URL) is a search engine page. Cloaked URLs may not exhibit malicious behavior when navigated to directly (e.g., requested without a referrer URL indicating a search engine). Additional request attributes may be verified by a malicious site web server including a user agent setting and/or an IP address. A malicious site web server may have a configuration file that has been changed by a hacker to recognize that a user is visiting this fake page after following a link from a search engine result page based on the detection of one or more request attributes such as a referrer URL, a user agent setting, and/or an IP address. This request may then be redirected (e.g., using HTTP status code 302 or another redirection method) to a malware or malicious web page, which may different from what the search engine spider actually sees. This may be because a search engine spider or crawler may send a network request with an IP Address of the originating page request which belongs to the Search engine. The network request from a spider or crawler may also have a user agent attribute which indicates a search engine. These attributes may be used by a malicious web site to avoid redirecting a search engine spider or crawler to the malicious content.

Malicious search result management module 154 may navigate to the search result in a manner that allows navigation to malicious content hidden using network redirection. For example, malicious search result management module 154 may send a network request (e.g., an HTTP GET request) for the content associated with the search result. The network request may be designed to appear to a potentially malicious site as if the request came from a user navigating from a search result (e.g., the Referrer URL may be set to a search engine page and the user agent may be set to a browser). Malicious search result management module 154 may identify search results which use network redirection for further analysis. A network request to a potentially malicious site may be performed in a virtual environment containing security software. The security software may detect malware and may prevent malware threats. Security software may use behavioral analysis, signature based analysis, reputation based analysis, and/or other methods. In addition to redirection, malicious search result management module 154 may look for other indicators associated with a potential malicious search engine result. For example, malicious URLs may have the patterns "php?<keyword based text>", "?bdoc=<keyword based text>", and/or "?azcp=<keyword based text>".

According to some embodiments, a search result may be flagged for further examination or an administrator may be notified.

Malware may include misleading applications messages such as, for example, a fake anti-virus software product, a fake network security software product, a fake anti-spyware software product, a fake computer disk optimization software product, a fake operating system update software product, a fake operating system registry tool software product, and/or a fake computer optimization software product. Malware may also include worms, viruses, and scams.

Once malware is detected malicious search result management module 154 may store data associated with the malicious search result. Malicious search result management module 154 may provide an indication or an alert associated with the malicious search result.

According to some embodiments, malicious search result management module 154 may be implemented in several portions which may be co-located or located remote from one another. As discussed above, one or more portions of malicious search result management module 154 may reside on network element 150 and may analyze and detect malicious search engine results. Indications of detected malicious search engine results may be provided to one or more modules of malicious search result management module 154 residing on server 140A and/or clients 110, 120, and 130.

According to some embodiments, server 140A may be a gateway and malicious search result management module 154 may forward search engine results to network element 150. Server 140A may receive indications of malicious search engine results from among the provided search engine results. Server 140A may deny access to search engine results indicated as malicious by network element 150.

According to some embodiments, clients 110, 120, and/or 130 may contain one or more modules of malicious search result management module 154 which may send search engine results to network element 150. Clients 110, 120, and/or 130 may receive indications of malicious search engine results from network element 150. If a search engine result is indicated as malicious one or more modules of malicious search result management module 154 residing on a client may deny access to the search engine result, may provide a warning associated with the search engine result, and/or may activate security software to address a malware threat. For example, a component of malicious search result management module 154 may be a browser plug-in or a browser bar which may perform one or more actions to protect a user of the browser from detected malicious search engine results.

According to some embodiments, clients 110, 120, and/or 130 may provide search results to be analyzed each time a search is performed. For example, search results may be provided to network element 150 which may analyze search results and provide an indication of malicious search results to the clients. Network element 150 may contain or access a repository, a database, or other electronic storage containing data associated with malicious search engine results. Upon detection of a malicious search engine result this electronic storage may be updated. Data associated with detected malicious search engine results (e.g., site ratings) may be provided to multiple clients so that the result may be appropriately handled (e.g., blocked or flagged by a browser add in or toolbar) without requiring detection at subsequent clients.

According to some embodiments, network element 150 may search results for analysis from a gateway, a firewall, or another network element each time a search is performed. The flow of search results from clients, gateways, firewalls, and/or other network components, may allow malicious search result management module 154 to identify the most common or most popular search results. These results may be the most threatening and/or the most likely to be infected with malicious search engine results. Hackers may update malicious search results frequently to ensure their keywords remain relevant to popular trends and thus are widely distributed. The flow of popular search results from clients, gateways, firewalls, and/or network components may help identify new threats from malicious sites.

In addition to receiving search results from clients or network components, malicious search result management module 154 may identify malicious search results through other methods. For example, malicious search result management module 154 may access one or more search engines and may identify popular keywords periodically (e.g., Google Hot trends keywords). Malicious search result management module 154 may use the identified popular keywords to perform a search at a search engine. The received results may be analyzed as described above and indications of malicious search results may be used to prevent malware threats. Collection of search results may be prioritized (e.g., top 100 search results analyzed). Analysis of search results may occur in order of ranking provided by a search engine. According to some embodiments, analysis of search engine results may be prioritized or further prioritized by detection of one or more indicators in a search item result (e.g., patterns "php?<keyword based text>", "?bdoc=<keyword based text>", and/or "?azcp=<keyword based text> in a URL may cause a search result to be analyzed first).

According to some embodiments, keywords may be provided to malicious search result management module 154 for searching. For example, a user may provide keywords which correspond to popular events to a search engine. The search engine results may be gathered and analyzed. According to some embodiments, keywords may be obtained from other network sources (e.g., parsed news feeds, trending topics on a website such as Twitter, etc.).

Malicious search result management module 154 may gather data at periodic intervals to ensure detection of new malicious search engine results. Intervals and hours for data gathering and analysis may be configurable (e.g., hourly, twice a day, daily, on demand, etc.).

FIG. 2 depicts a block diagram of a computer system 200 in accordance with an embodiment of the present disclosure. Computer system 200 is suitable for implementing techniques in accordance with the present disclosure. Computer system 200 may include a bus 212 which may interconnect major subsystems of computer system 210, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM may be the main memory into which the operating system and application programs may be loaded. The ROM or flash memory can contain, among other code, the Basic Input-Output system (BIOS) which controls basic hardware operation such as the interaction with peripheral components. Applications resident with computer system 210 may be stored on and accessed via a computer readable medium, such as a hard disk drive (e.g., fixed disk 244), an optical drive (e.g., optical drive 240), a floppy disk unit 237, or other storage medium. For example, malicious search result management module 154 may be resident in system memory 217.

Storage interface 234, as with the other storage interfaces of computer system 210, can connect to a standard computer readable medium for storage and/or retrieval of information, such as a fixed disk drive 244. Fixed disk drive 244 may be a part of computer system 210 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244, optical disk 242, or floppy disk 238. Code to implement the present disclosure may also be received via one or more interfaces and stored in memory. The operating system provided on computer system 210 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

Figure 3:
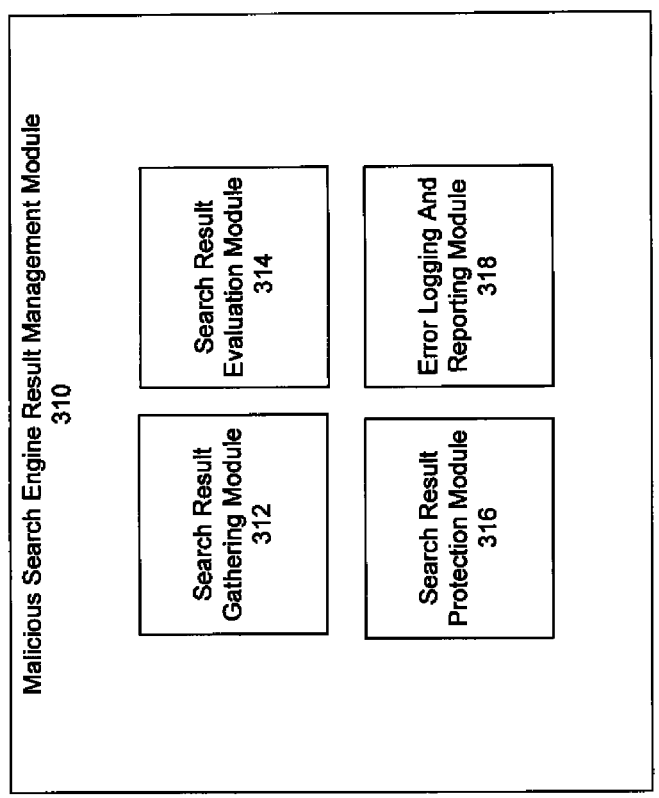
FIG. 3 shows a module for identifying optimized malicious search engine results in accordance with an embodiment of the present disclosure.

Referring to FIG. 3, there is shown a malicious search engine result management module 310 in accordance with an embodiment of the present disclosure. As illustrated, the malicious search engine result management module 310 may contain one or more components including search result gathering module 312, search result evaluation module 314, search result protection module 316, and error logging and reporting module 318.

The description below describes network elements, computers, and/or components of a system and method for identifying optimized malicious search engine results that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

Search result gathering module 312 may gather search results from clients, gateways, firewalls, and/or other network elements, according to some embodiments. Clients may provide search results to search result gathering module 312 each time a search is performed. Search result gathering module 312 may receive search results from a gateway, a firewall, or another network element each time a search is performed, according to some embodiments.

In addition to receiving search results from clients or network components, Search result gathering module 312 may identify malicious search results through other methods. For example, Search result gathering module 312 may access one or more search engines and may identify popular keywords periodically (e.g., Google Hot trends keywords). Search result gathering module 312 may use the identified popular keywords to perform a search at a search engine. Collection of search results may be prioritized (e.g., top 100 search results analyzed).

Search result evaluation module 314 may receive search results from search result gathering module 312. Search result evaluation module 314 may navigate to the search result in a manner that allows navigation to malicious content hidden using network redirection. For example, search result evaluation module 314 may send a network request (e.g., an HTTP GET request) for the content associated with the search result. The network request may be designed to appear to a potentially malicious site as if the request came from a user navigating from a search result (e.g., the Referrer URL may be set to a search engine page and the user agent may be set to a browser). Search result evaluation module 314 may identify search results which use network redirection for further analysis. A network request to a potentially malicious site may be performed in a virtual environment containing security software. The security software may detect malware and may prevent malware threats. Security software may use behavioral analysis, signature based analysis, reputation based analysis, and/or other methods. In addition to redirection, search result evaluation module 314 may look for other indicators associated with a potential malicious search engine result. For example, malicious URLs may have the patterns "php?<keyword based text>", "?bdoc=<keyword based text>", and/or "?azcp=<keyword based text>".

According to some embodiments, a search result may be flagged for further examination or an administrator may be notified.

Search result evaluation module 314 may store indicators or malicious or poisoned search results in electronic storage such as a database. Indicators may be provided to one or more clients, gateways, firewalls, or other components to provide malware protection.

Search result protection module 316 may receive an indicator of malicious search results from search result evaluation module 314. Search result protection module 316 may block access or deny access to a malicious search results. Search result protection module 316 may be configurable. Search result protection module 316 may warn a user but may allow access. Search result protection module 316 may activate other security software to reduce or prevent a malware threat associated with a malicious search result. According to some embodiments, a user may be able to request access to a malicious search engine result or an administrator may be able to provide access to a malicious search engine result.

Error logging and reporting module 318 may produce logs, reports, or other information associated with identifying optimized malicious search engine results.

Figure 4:
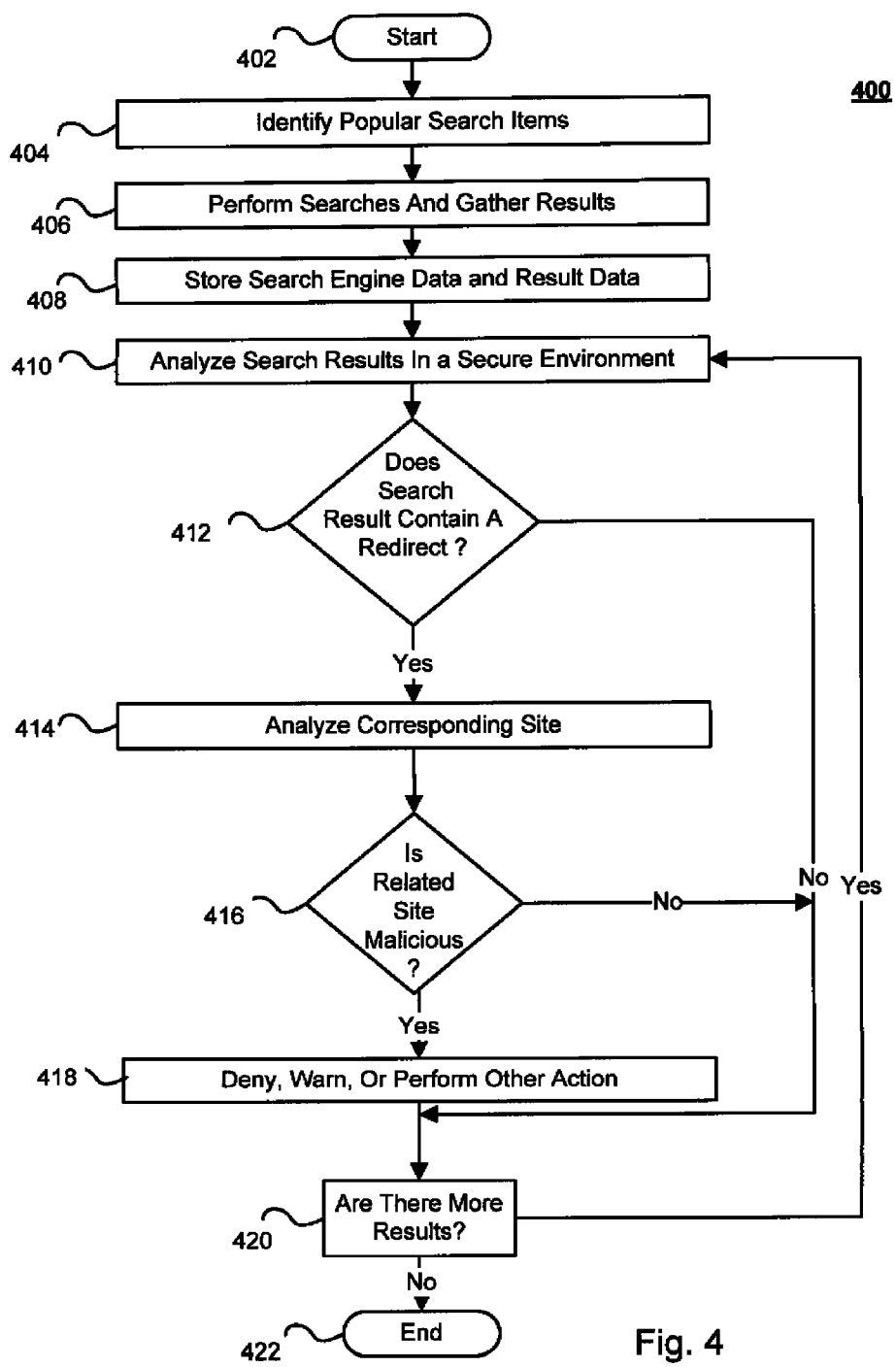
FIG. 4 depicts a method for identifying optimized malicious search engine results in accordance with an embodiment of the present disclosure.

Referring to FIG. 4, there is depicted a method 400 for identifying optimized malicious search engine results in accordance with an embodiment of the present disclosure. At block 402, the method 400 may begin.

At block 404, one or more popular search items or keywords may be identified. Keywords may be identified by accessing popular keywords provided by a search engine (e.g., Google "Hot trends"). According to some embodiments, keywords may be received from clients based on client searches or from gateways or other network components based on received or transmitted search requests.

At block 406, searches may be performed using identified keywords. Searches may be performed at a plurality of different search engines.

At block 408, search engine data and result data may be stored.

At block 410, search results may be analyzed in a virtual environment containing security software. Analysis may include requesting search result in a manner that allows navigation to malicious content hidden using network redirection. For example, a network request may be sent (e.g., an HTTP GET request) for the content associated with the search result. The network request may be designed to appear to a potentially malicious site as if the request came from a user navigating from a search result (e.g., the Referrer URL may be set to a search engine page and the user agent may be set to a browser).

At block 412, it may be determined whether a search result contains a redirect (e.g., it uses an HTTP status 302 code to redirect to another web page other than that indicated in the search result URL). If a search result uses network redirection the method 400 may continue at block 414. If a search result does not use network redirection the method may continue at block 418.

At block 414, the method may analyze the search result and the corresponding site. A network request to a potentially malicious site may be performed in a virtual environment containing security software. The security software may detect malware and may prevent malware threats. Security software may use behavioral analysis, signature based analysis, reputation based analysis, and/or other methods. In addition to redirection, analysis may include looking for other indicators associated with a potential malicious search engine result. For example, malicious URLs may have the patterns "php?<keyword based text>", "?bdoc=<keyword based text>", and/or "?azcp=<keyword based text>".

According to some embodiments, a search result may be flagged for further examination or an administrator may be notified.

At block 416 it may be determined whether a search result and/or a related site is malicious. If a search result and/or a related site is malicious the method 400 may continue at block 420. If a search result and/or a related site is not malicious the method 400 may continue at block 418.

At block 418, one or more actions may be performed in response to detection of a malicious search result. An indication of the malicious search result may be stored. Indications of the malicious search result may be provided to one or more clients, gateways, firewalls, or other network components. Users may be warned and/or denied access to the malicious search result.

At block 420 it may be determined whether additional search results require analysis. If additional search results require analysis the method may return to block 410. If no further search results require analysis the method may end at block 422.

At block 422, the method 400 may end.

FIG. 5 depicts analysis of detection of malicious search engine results in accordance with an embodiment of the present disclosure. According to an exemplary embodiment, analysis 502 of the top twenty-five search terms for a popular event such as for example, the 2010 Oscars, may show the total number of clean and malicious search results out of the first hundred or so search results. The total number of malicious search results for a set of search terms may prioritize analysis for further user requests. For example, as illustrated in row 1, the search terms "oscar ballot 2010 printable" resulted in 75 search results which were identified as malicious out of the first 102 search results. This may be higher than other sets of search terms for the same topic (e.g., the 2010 Oscars). Thus subsequent searches with similar or identical keywords may be given higher priority for analysis, according to some embodiments. According to other embodiments, priority for analysis may be based on search engine keyword rankings or on rankings of searches received from clients.

FIG. 6 depicts a user interface 602 indicating detection of malicious search engine results in accordance with an embodiment of the present disclosure. As illustrated in FIG. 6, indicators 604, 606, 608, 610, and other unlabeled search result indicators may indicate that a search result is malicious. Different indicators may be used. According to some embodiments, indicators may indicate levels of threats, warnings, or denial of access to search results. According to some embodiments, search results may not contain an indicator but a search result may be blocked by a gateway, a firewall, or another network component when requested by a client. The gateway, firewall, or other network component may provide a message at that time (e.g., "Request denied due to detection of malicious content.")

At this point it should be noted that identifying optimized malicious search engine results in accordance with the present disclosure as described above typically involves the processing of input data and the generation of output data to some extent. This input data processing and output data generation may be implemented in hardware or software. For example, specific electronic components may be employed in an optimized malicious search engine results identification module or similar or related circuitry for implementing the functions associated with identifying optimized malicious search engine results in accordance with the present disclosure as described above. Alternatively, one or more processors operating in accordance with instructions may implement the functions associated with identifying optimized malicious search engine results in accordance with the present disclosure as described above. If such is the case, it is within the scope of the present disclosure that such instructions may be stored on one or more processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for identifying optimized malicious search engine results comprising:
   receiving a search item result;
   analyzing, using at least one computer processor of a server, the search item result in a secure environment to detect malware hidden using network redirection, wherein analyzing comprises automatically navigating to a network location associated with the search item result using a network request generated by the server and configured to appear to the network location as a network request from a user of the search result;
   determining that the search item result is associated with malware; and
   providing an indicator that the search item result is associated with malware.

2. The method of claim 1, wherein the network request comprises a network request containing at least one of: a referring search engine Uniform Resource Locator (URL); a user agent set as a browser; and a source id set as a browser.

3. The method of claim 1, wherein the determination is based upon at least one of: a signature, behavioral analysis, and reputation based analysis.

4. The method of claim 1, wherein the secure environment comprises a virtual environment containing security software to address malware threats.

5. The method of claim 1, further comprising:
   identifying a popular search term; and
   performing a search using the identified popular search term.

6. The method of claim 5, wherein the popular search term is identified by one or more of:
   using a search engine index of most popular search terms;
   collecting one or more statistics from users associated with search data; and
   identifying search terms based on popular current events.

7. The method of claim 1, wherein the search engine result is received from a remote computing device.

8. The method of claim 7, wherein the indicator that the search item result is associated with malware is provided to the remote computing device.

9. The method of claim 1, further comprising blocking access to the search item result based at least in part on the determination that the search item result is associated with malware.

10. The method of claim 1, further comprising providing a warning associated with the search item result based at least in part on the determination that the search item result is associated with malware.

11. The method of claim 1, further comprising storing the indicator that the search item result is associated with malware in a repository.

12. The method of claim 1, wherein providing an indicator that the search item result is associated with malware comprises at least one of:
   transmitting the indicator to a client device component;
   transmitting the indicator to a gateway; and
   transmitting the indicator to a firewall.

13. The method of claim 12, wherein the client device component comprises a browser component designed to perform one or more of:
   denying access to a search item result network site indicated as associated with malware;
   providing a warning about a search item result network site indicated as associated with malware; and
   activating one or more security components to reduce a threat from a search item result network site indicated as associated with malware.

14. The method of claim 12, wherein the gateway comprises:
   a component configured to perform one or more of:
   deny access to search item results indicated as associated with malware; and
   filter out search item results indicated as associated with malware.

15. The method of claim 1, where network redirection comprises an HTTP redirection code.

16. An article of manufacture for identifying optimized malicious search engine results, the article of manufacture comprising:
   at least one non-transitory processor readable medium; and
   instructions stored on the at least one medium;
   wherein the instructions are configured to be readable from the at least one medium by at least one processor and thereby cause the at least one processor to operate so as to:
   receive a search item result;
   analyze the search item result in a secure environment to detect malware hidden using network redirection, wherein analyzing comprises automatically navigating to a network location associated with the search item result using a network request generated by a server and configured to appear to the network location as a network request from a user of the search result;
   determine that the search item result is associated with malware; and
   provide an indicator that the search item result is associated with malware.

17. A system for identifying optimized malicious search engine results comprising:
   one or more processors communicatively coupled to a network; wherein the one or more processors are configured to:
   receive a search item result;
   analyze the search item result in a secure environment to detect malware hidden using network redirection, wherein analyzing comprises automatically navigating to a network location associated with the search item result using a network request generated by a server and configured to appear to the network location as a network request from a user of the search result;

determine that the search item result is associated with malware; and provide an indicator that the search item result is associated with malware.

18. The system of claim 17, wherein the one or more processors are further configured to:

identify a popular search term; and perform a search using the identified popular search term.

* * * * *